J. WEAVER.
Rotary Cultivator.
No. 253.
Patented July 5, 1837.
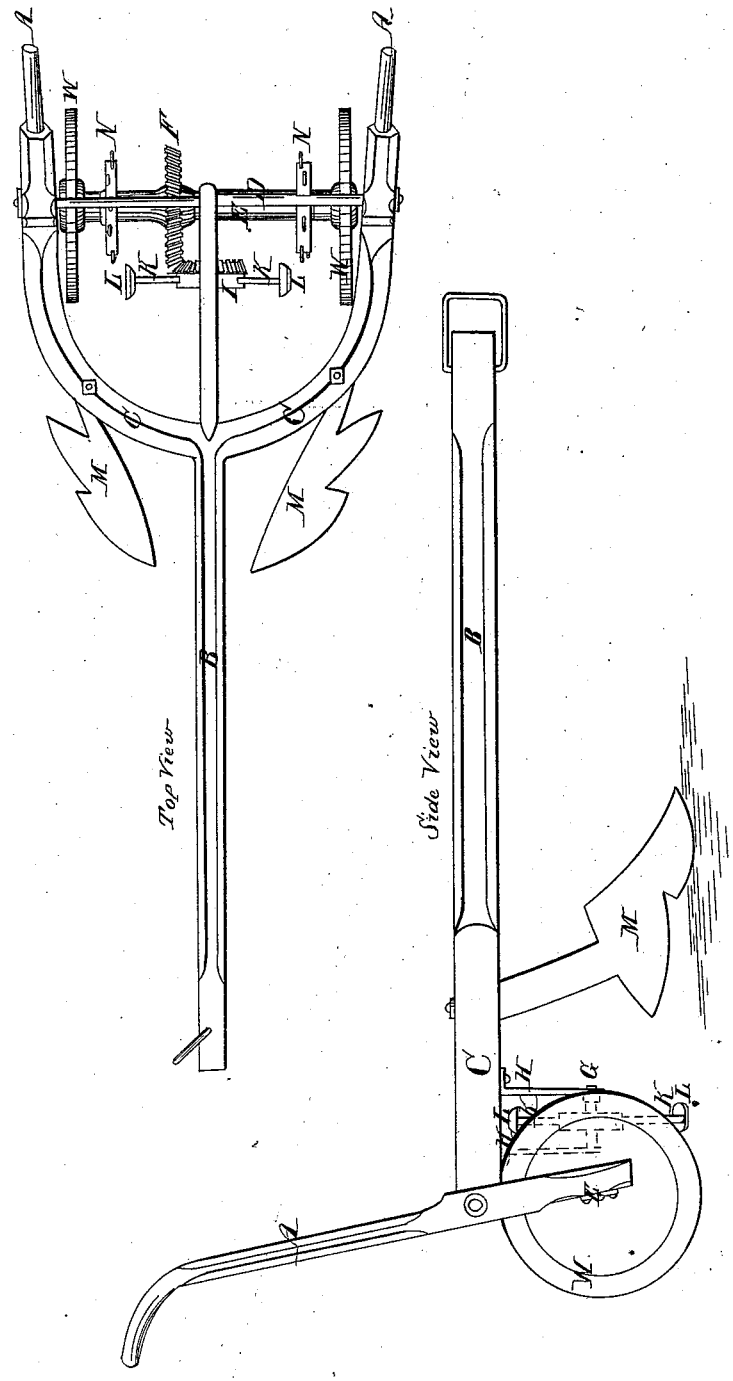

UNITED STATES PATENT OFFICE.

JOHN WEAVER, OF WASHINGTON, DISTRICT OF COLUMBIA.

IMPROVEMENT IN MACHINES FOR THINNING COTTON-PLANTS,

Specification forming part of Letters Patent No. 253, dated July 5, 1837.

*To all whom it may concern:*

Be it known that I, JOHN WEAVER, of the city of Washington, in the District of Columbia, have invented a new and useful improvement in machines for thinning or cutting out the exuberant cotton-plants from the rows, called "Weaver's Cotton-Thinner," which is described as follows, reference being had to the annexed drawings of the same, making part of this specification.

A A represent the handles of the machine for guiding it; B, the beam, connected to the handles by two curved braces, C C, and a cross-bar, D, passing through the beam at right angles; E, a horizontal axle turning in boxes secured to the lower ends of the handles, on which are two wheels, W W, turning on the ground; F, a bevel-wheel on the axle E, working into another bevel-wheel, J, on an axle, G, turning in round apertures or boxes in the ends of plates H H, the other ends being turned at right angles and screwed or bolted or otherwise fastened to the under side of the beam and projecting downward from the same; I, a circular plate fastened to the bevel-wheel and revolving with it, from the periphery of which project arms or handles K K K, with hoes L L L for cutting or thinning out the overabundant cotton-plants; M M, two plows, the one a right and the other a left hand plow, secured to the curved braces for opening a furrow on each side of the row, and in which the wheels W W turn; N N, two revolving harrows for loosening the earth near the cotton-plants, said harrows being two wheels fastened on the main axle E, with arms or teeth projecting from their peripheries.

The animals are attached to the beam and move forward with the machine in the manner of an ordinary plow, the attendant having hold of the handles and guiding it. The two plows open a furrow on each side of the row, throwing the earth from it. The wheels follow in these furrows, the friction of which on the ground turns the axle E, and with it the bevel-wheel and harrows N N. This bevel-wheel turns the other bevel-wheel, J, which turns the circular plate I and revolving hoes that cut out the overabundant cotton-plants, the distance of cutting being determined by the diameters of the bevel-wheels and number of hoes in the circular plate.

I do not claim any part of the before-described machine separately; nor do I claim the principle of revolving hoes for thinning out cotton-plants; but I do claim—

The use and application of the revolving harrows in combination with the before-described machine.

JOHN WEAVER.

Witnesses:
WM. P. ELLIOT,
GEORGE V. WEBB.